US006633708B1

(12) United States Patent
Lim

(10) Patent No.: US 6,633,708 B1
(45) Date of Patent: Oct. 14, 2003

(54) MICROMACHINED APPARATUS AND TECHNIQUE TO ALIGN TWO DIMENSIONAL FIBER ARRAY

(75) Inventor: Martin Lim, San Mateo, CA (US)

(73) Assignee: OpticNet, Inc., Hayward, CA (US)

(*) Notice: Subject to any disclaimer, the term of this patent is extended or adjusted under 35 U.S.C. 154(b) by 231 days.

(21) Appl. No.: 09/799,965

(22) Filed: Mar. 6, 2001

(51) Int. Cl.[7] .............................. G02B 6/26; G02B 6/42
(52) U.S. Cl. ........................ 385/52; 385/115; 385/120
(58) Field of Search .......................... 385/52, 38, 115, 385/120

(56) References Cited

U.S. PATENT DOCUMENTS

| | | | | |
|---|---|---|---|---|
| 5,185,846 A | * | 2/1993 | Basavanhally et al. | 385/137 |
| 5,483,611 A | * | 1/1996 | Basavanhally | 385/78 |
| 6,102,582 A | * | 8/2000 | Espindola et al. | 385/57 |
| 6,381,382 B2 | * | 4/2002 | Goodman et al. | 385/22 |

OTHER PUBLICATIONS

P. Tayebati, et al., "Microelectromechanical Tunable Filter With Stable Half Symmetric Cavity" Electronics Letters, 34, (1998), pp. 1967–1968.

M. Sekimura, "Anisotropic Etching of Surfactant–Added TMAH Solution," IEEE International Conference on Microelectomechanical Systems, (1999), pp. 650–655.

D. J. Sadler, et al., "Optical Reflectivity of Micromachined {111}–oriented Silicon Mirrors For Optical Input–Output Couplers," Journal of Micromech. Microeng. 7 (1997) pp. 263–269.

* cited by examiner

*Primary Examiner*—Brian Healy
*Assistant Examiner*—Kevin S Wood
(74) *Attorney, Agent, or Firm*—Coudert Brothers LLP

(57) ABSTRACT

Optical fibers are aligned in a jig of parallel apertured plates in which the fibers are inserted and positioned by the use of V-shaped or positioning ribbon actuators. The actuators are thermally actuated by a closed loop feedback system to center each individual fiber and its light output on an equivalent juxtaposed photodetector array. When the fiber is centered by this feedback technique it is permanently fixed in that position by potting, for example. The feedback control constitutes either a totally electrical system utilizing a processing unit or can be partially manually controlled by a human operator operating a joystick and viewing a meter or similar device which indicates an approach to a maximum output from a photodetector.

5 Claims, 4 Drawing Sheets

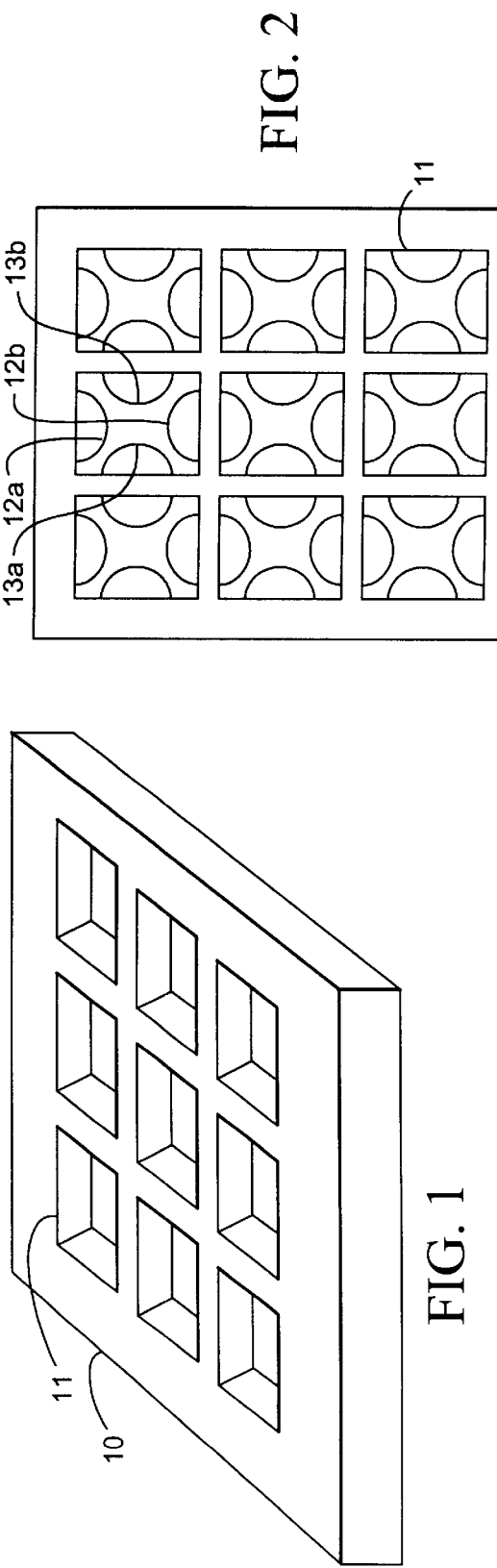
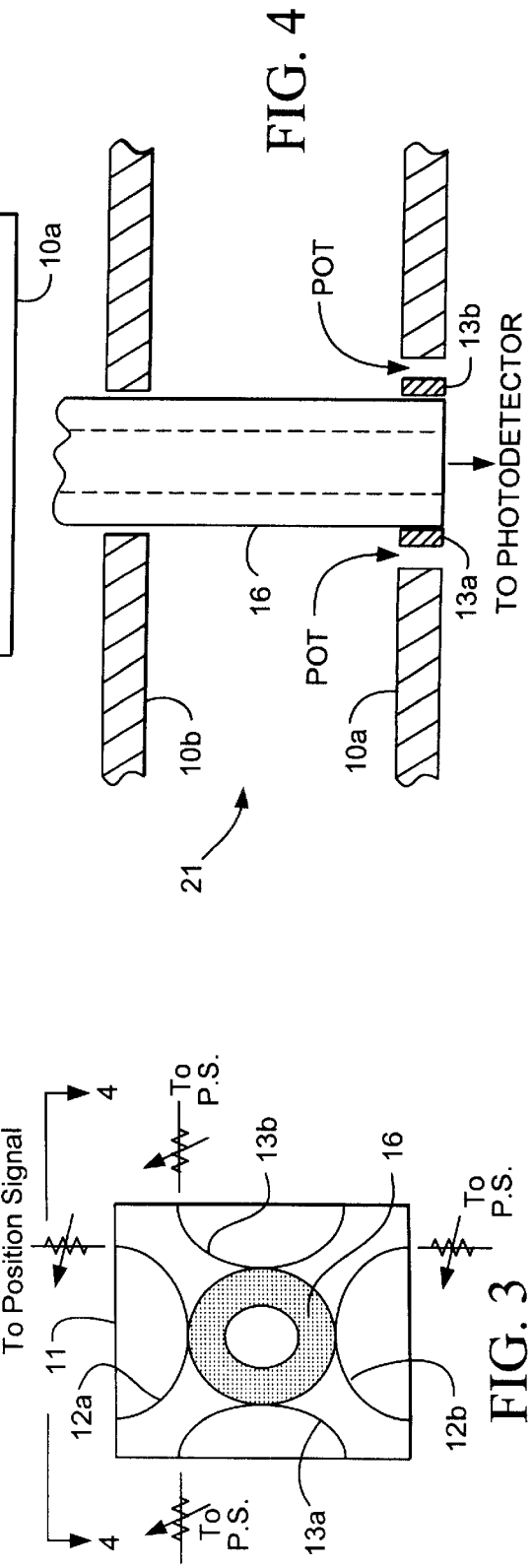

MICROMACHINED APPARATUS AND TECHNIQUE TO ALIGN TWO DIMENSIONAL FIBER ARRAY

The present invention is directed to a method of aligning a two-dimensional fiber array of light carrying fibers and also to a micromachined apparatus for performing the above method.

BACKGROUND OF THE INVENTION

In the fiber optic field where the fibers carry light with information, fiber component manufacturers must couple the fiber to a end device. With large fiber arrays a number of input and output ports must be aligned. For example, a typical arrangement is a large optical switch where the fibers are arranged in a two-dimensional array. Prior techniques involve fiber manipulation by manual feedback optical circuits or require labor intensive fiber handling using stacked V-grooves where the vertical stacking, with precise thickness control, is critical and not mature.

OBJECT AND SUMMARY OF THE INVENTION

It is an object of the present invention to provide a micromachined apparatus and a method for aligning a two dimensional fiber array.

In accordance with the above object there is provided a method aligning a two dimensional array of light carrying fibers including the step of providing a pair of apertured plates having an array of apertures which have common axes with the axes being parallel to one another with at least one aperture plate having for each aperture, positioning members. A plurality of fibers are inserted through the apertures of both plates so that prepared fiber ends are substantially co-planar with the face of a proximal plate. The proximal plate is positioned in juxtaposition with a fixed photodetector array where each photodetector corresponds to a respective fiber end. A distal fiber end is successively actuated with a light source, the positioning members are actuated to move the fiber. The corresponding photodetector for sensing a maximum light output includes a closed loop feedback system. When a maximum is sensed, the fiber is permanently fixed in place in the aperture, of at least the proximal plate whereby the fiber end is centered on the photodector.

Also in accordance with the invention, an aperture plate used in the foregoing aligning technique comprises a semiconductor plate having an array of micromachined apertures for holding an array of the fibers each aperture including positioning means for moving a fiber within the aperture to a destined location. Actuating means responsive to a control input and connected to said positioning means move the fiber to the location.

BRIEF DESCRIPTION OF THE DRAWINGS

FIG. 1 is a perspective view of an aperture plate used in the present invention.

FIG. 2 is a plan view of the plate of FIG. 1 which has been modified.

FIG. 3 is an enlarged detail view of a portion of FIG. 2 incorporating a light fiber.

FIG. 4 is a cross-sectional view taken along the line 4—4 of FIG. 3.

DETAILED DESCRIPTION OF THE PREFERRED EMBODIMENT

Figure 5:
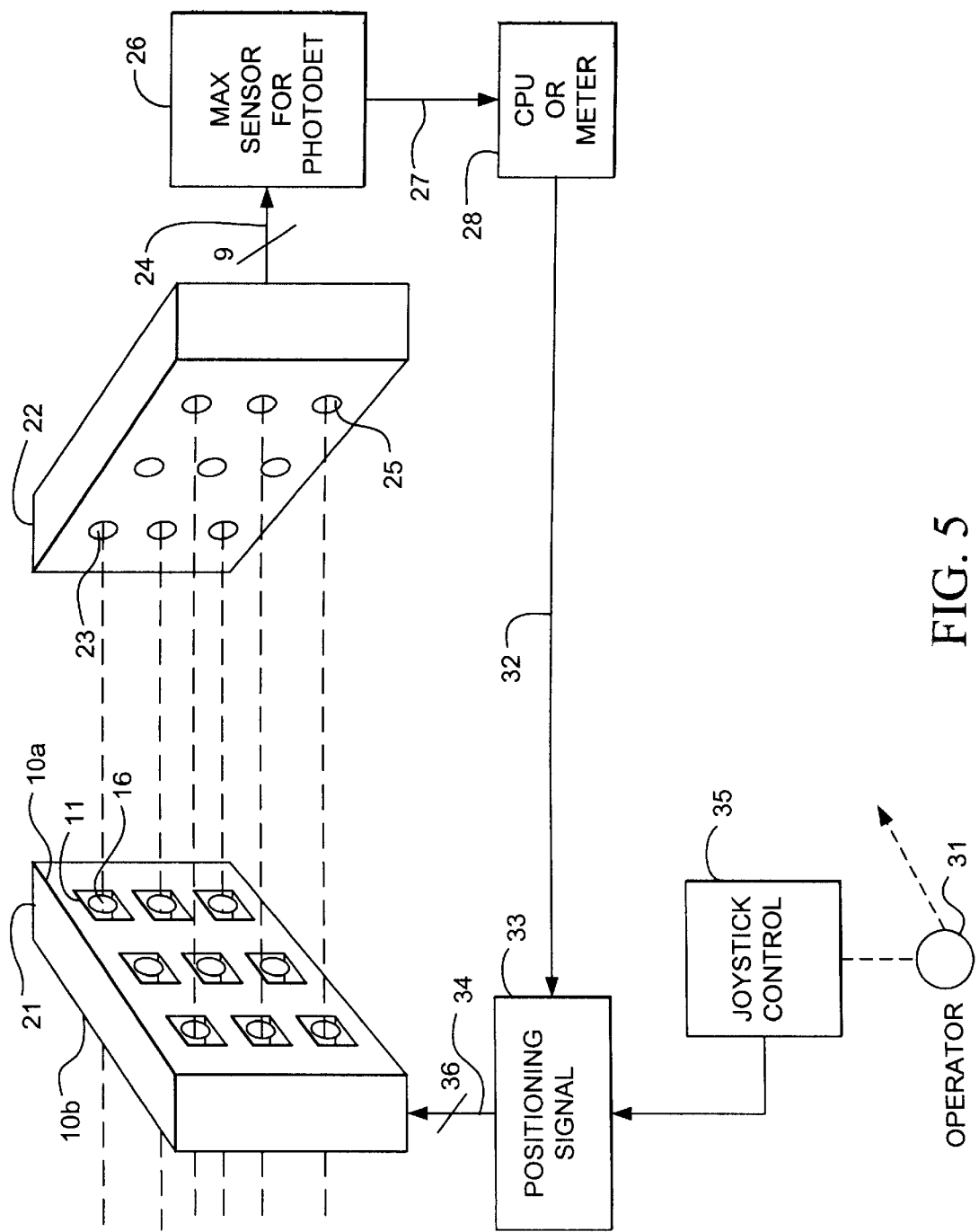
FIG. 5 is a schematic diagram illustrating the method of the present invention.

FIG. 1 is a micromachined semiconductive aperture plate 10 having a two-dimensional array of apertures 11 (in this case there are nine apertures) which are dimensioned to accept light fibers of less than millimeter dimensions. As illustrated in FIG. 2, each aperture at least for one plate denoted 10a, has two pairs of positioning ribbons 12a, 12b and 13a, 13b. These ribbons may either be of the same material as the semiconductive plate itself or constructed to form in effect a bimetallic leaf spring.

FIG. 3 is an enlarged view of one of the apertures 11 of FIG. 2 showing inserted within the aperture and the positioning ribbons a fiber 16 which is illustrated as a inner fiber and an outer cladding for the efficient carrying or conduction of light. After the fiber 16 is inserted into the ribbon arrangement, the positioning ribbons may be thermally actuated by the symbolically illustrated rheostats which as illustrated are connected to position signals (P.S.). In other words, by passing current through the ribbons the heating effect would cause expansion and contraction (with a lack of current) to move to a desired "centered position."

FIG. 4 illustrates a unitary pair of aperture plates 10a and 10b in which the fibers 16 are inserted to form a fixed structure for obtaining an array of fibers in a desired position. This final structure is illustrated at 21 where the plates 10a and 10b are shown as a unitary structure. In order to align a fiber 16 with an aperture 11 so that it is centered to a desired location (for later coupling to a desired device), the aperture plate unit 21 is juxtaposed with a fixed and equivalent photodetector array 22 having an array of photodetectors 23. Thus in the illustration there are nine photodetectors, one corresponding to each fiber 16 in the aperture plate structure 21. Each of the nine photodetectors 23 is coupled by a line 24 (having nine conductors) to a photodetector sensor unit 26 which senses the intensity of a light signal from a photodetector and is able to compare the signal to a predetermined maximum which will occur when the light from a juxtaposed light fiber 16 (whose prepared fiber ends are substantially co-planar with the face of plate 10a) is incident upon the center of a associated photodetector 23 to produce a maximum signal. The output of unit 26 on line 27 is coupled to a central processing unit (CPU) or meter 28. The processing unit or meter would have stored in memory a predetermined maximum signal to thus allow the computer to either visually signal a user or an operator, for example, at 31 that the fiber is being moved to an appropriate maximum position, or via an electrical feedback line 32 to a positioning signal unit 33 to automatically sense the approach to or away from the maximum. Then on the line 34 each of the various positioning ribbons is fed an appropriate positioning signal. Thus by sensing the approach to the maximum output of the photodetector and by the closed loop feedback system provided via the CPU 28, feedback line 32 and positioning signal unit 33, the fiber may be appropriately centered. An alternative or additional technique is by use of a joystick control unit 35 and operator 31. A view meter 28 can provide an appropriate positioning signal from unit 33. The output of positioning signal unit 33 for a nine unit array would be 36 lines as indicated.

When a fiber is aligned, it is then permanently fixed in place as indicated in FIG. 4 by a potting procedure where suitable plastic is injected between the ribbons 12a, 12b and 13a, 13b and the aperture walls.

Figure 6:
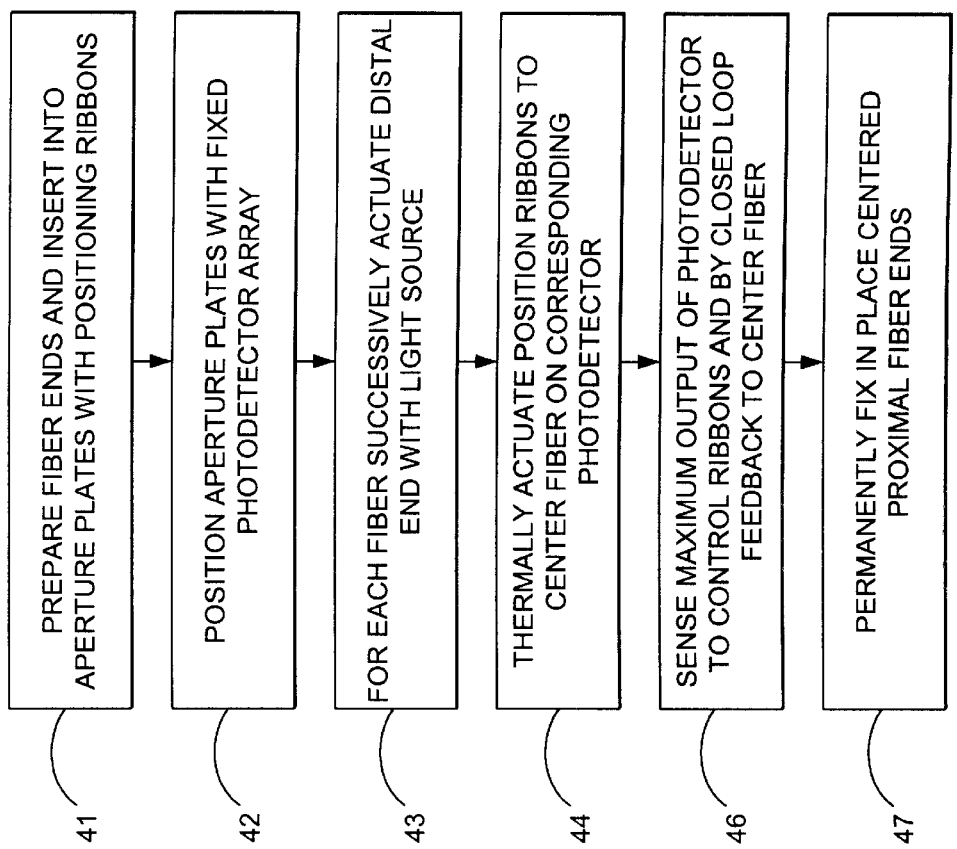
FIG. 6 is a flow chart illustrating the method of the present invention.

FIG. 6 summarizes the above method of the present invention where in step 41 the fiber ends are prepared and inserted into the pair of aperture plates (that is unit 21 shown in FIG. 5) where at least one aperture plate includes positioning ribbons. Since the light fiber 16 is fairly rigid, it is anticipated that the second aperture plate 10b would merely retain the distal end of the light fiber with the proximal ends held and positioned by the proximal aperture plate 10a.

Next at step 42 the aperture plate at unit 21 is positioned and juxtaposed with the fixed photodetector array 22. Then in step 43, each fiber is successively actuated at its distal end with a light source and in step 44 the positioning ribbons are thermally actuated to center the fiber on a corresponding photodetector. The technique of centering is shown in step 46 where ultimately the maximum output of a photodetector is sensed to control the ribbons by a closed loop feedback. This can be done automatically or partially manually by the joystick control. Then lastly in step 47 the fiber is permanently fixed in place by, for example, potting. In addition to the above method of aligning, the aperture plate 10a with its ribbons or positioning members provides an efficient positioning technique.

Figure 7:
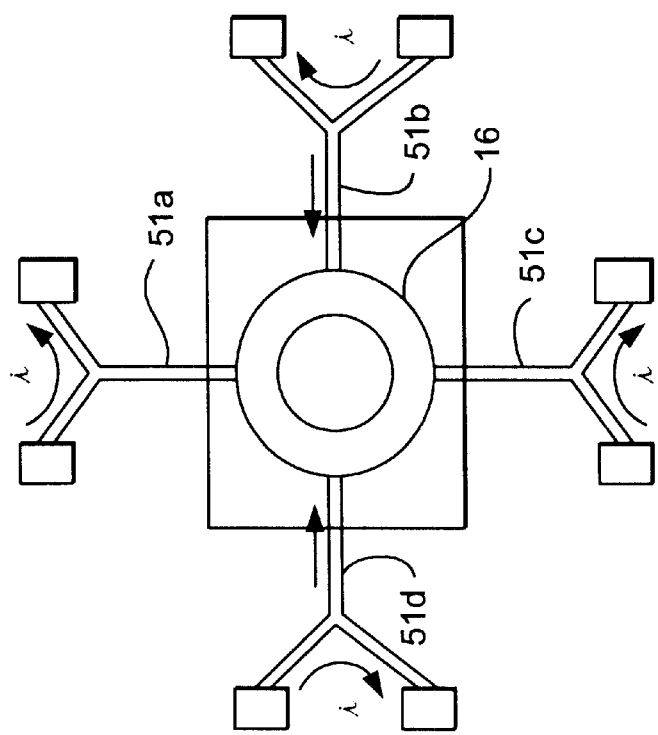
FIG. 7 is a plan view of an alternative to FIG. 3.

As an alternative to the use of thermally actuated ribbons to position a fiber 16, FIG. 7 illustrates an alternative technique where V-shaped electro-thermal actuators 51a, 51b, 51c and 51d are used. At the apex of the V illustrated, is a actuator extension which is in contact with ribbon 16. A drive voltage (not shown) produces a current in the V-portion of the actuator lengthening the two legs of the V to push the apex extension against the fiber 16 to move it. The indicated currents flowing in the V-shaped members cause thermal expansion. This type of electro-thermal inplane actuator is more fully disclosed in a co-pending application entitled "Latching Mechanism for MEMS Actuator and Method of Fabrication" in the names of Martin Lim, Robert Jui-Lin Fan and Long Que.

Figure 8:
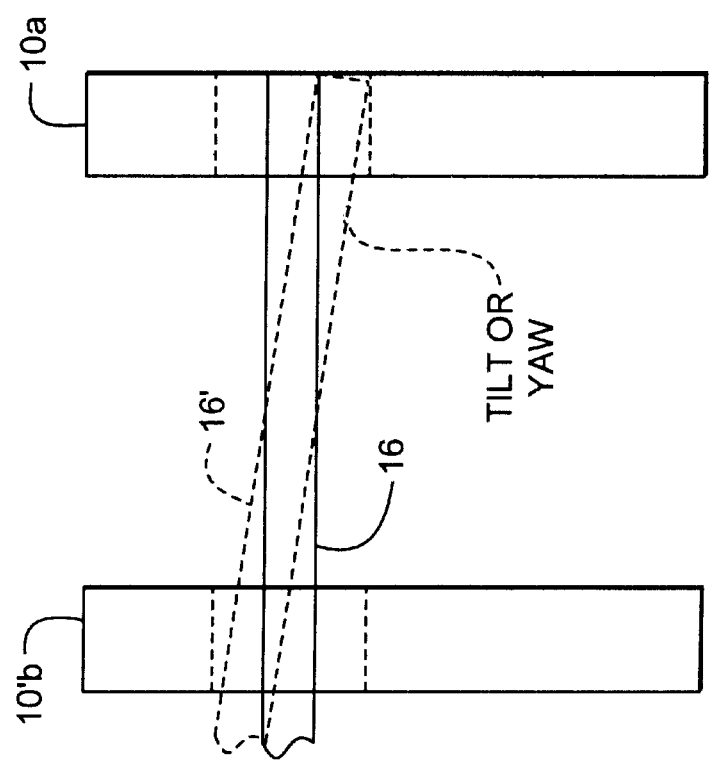
FIG. 8 is a cross-sectional view of an alternative to FIG. 4.

FIG. 8 is an alternative construction to FIG. 4, where in addition to the plate 10a having positioning members, the plate 10b, now designated 10'b, also has similar positioning members. Thus, the initial ribbon 16 is shown before alignment and then by actuation of positioning members on both plates a tilt or yaw adjustment may be made as shown by the dashed fiber 16'.

Thus a micromachined apparatus and technique to align two dimensional fiber array has been provided.

What is claimed is:

1. A method of aligning a two dimensional fiber array of light carrying fibers comprising the following steps:

providing a pair of apertured plates having an array of apertures which have common axes with the axes being parallel to one another;

for at least one aperture plate, providing positioning members for each aperture;

inserting a plurality of fibers through said apertures of both plates so that prepared fiber ends are substantially co-planar with the face of a proximal plate;

positioning said proximal plate in juxtaposition with a fixed photodetector array where each photodetector corresponds to a respective fiber end;

for each fiber, successively actuating a distal end with a light source;

actuating said positioning members to move said fiber;

for the corresponding photodetector, sensing a maximum light output including a closed loop feedback system;

when a maximum is sensed, permanently fixing in place in said aperture said fiber in at least said proximal plate whereby said fiber end is centered on said photodetector.

2. An aperture plate for use in aligning an array of light carrying fibers comprising;

a semiconductive plate having an array of micromachined apertures for holding an array of said fibers each aperture including positioning means for moving a fiber within said aperture to a desired location;

actuating means responsive to a control input and connected to said positioning means for moving said fiber to said location.

3. An aperture plate as in claim 2 where said positioning means are a plurality of thermally actuated ribbons.

4. An aperture plate as in claim 2 where said positioning members are a plurality of thermally actuated V-shaped positioning members having apexes coupled to said fiber.

5. A method as in claim 1 where both of said pair of aperture plates have positioning members and including the step of moving a fiber to adjust yaw or tilt.

* * * * *